(12) United States Patent
Maruyama

(10) Patent No.: US 12,362,674 B2
(45) Date of Patent: Jul. 15, 2025

(54) CONTROL CIRCUIT AND SWITCHING POWER SOURCE

(71) Applicant: FUJI ELECTRIC CO., LTD., Kanagawa (JP)

(72) Inventor: Hiroshi Maruyama, Matsumoto (JP)

(73) Assignee: FUJI ELECTRIC CO., LTD., Kanagawa (JP)

(*) Notice: Subject to any disclaimer, the term of this patent is extended or adjusted under 35 U.S.C. 154(b) by 509 days.

(21) Appl. No.: 17/746,908

(22) Filed: May 17, 2022

(65) Prior Publication Data

US 2023/0024431 A1    Jan. 26, 2023

(30) Foreign Application Priority Data

Jul. 21, 2021 (JP) ................. 2021-120693

(51) Int. Cl.
  *H02M 3/335* (2006.01)
  *H02M 1/00* (2006.01)
  *H02M 1/32* (2007.01)

(52) U.S. Cl.
  CPC ..... *H02M 3/33553* (2013.01); *H02M 1/0009* (2021.05); *H02M 1/32* (2013.01)

(58) Field of Classification Search
  CPC .. H02M 1/0009; H02M 1/32; H02M 3/33553; H02M 3/33538; H02M 3/33546; H02M 3/33515; H02M 3/33523; H02M 3/3353; H02M 3/33507; H02M 3/335
  See application file for complete search history.

(56) References Cited

U.S. PATENT DOCUMENTS

2006/0221528 A1   10/2006  Li
2006/0227476 A1*  10/2006  Yang ................. H02M 3/33507
                                                              361/90
2021/0167684 A1    6/2021  Matsumoto

FOREIGN PATENT DOCUMENTS

| JP | H05211715 A | 8/1993 |
| JP | 2003070247 A | 3/2003 |
| JP | 2009183037 A | 8/2009 |
| JP | 2021090234 A | 6/2021 |

OTHER PUBLICATIONS

Office Action issued for counterpart Japanese Application No. 2021-120693, transmitted from the Japanese Patent Office on Feb. 25, 2025 (drafted on Feb. 19, 2025).

* cited by examiner

*Primary Examiner* — Nguyen Tran

(57) ABSTRACT

Provided is a control circuit configured to control a switching element of a switching power source, the control circuit comprising: a first protection unit configured to stop a principal current flowing through the switching element when the principal current of the switching element has exceeded a first threshold value; and a second protection unit configured to stop the principal current of the switching element over a longer time period than the first protection unit when the principal current has exceeded a second threshold value larger than the first threshold value. The first protection unit may shorten a pulse width of a control pulse in one cycle of an oscillation signal, and the second protection unit may fix the switching element to the off-state over a plurality of cycles of the oscillation signal.

20 Claims, 9 Drawing Sheets

CONTROL CIRCUIT AND SWITCHING POWER SOURCE

The contents of the following Japanese patent application are incorporated herein by reference:
No. 2021-120693 filed in JP on Jul. 21, 2021

BACKGROUND

1. Technical Field

The present invention relates to a control circuit and a switching power source.

2. Related Art

A switching power source has been known in the prior art that outputs a predetermined voltage or current by repeatedly transitioning a switching element to an on-state and an off-state (see Patent Document 1, for example).

Patent Document 1: Japanese Patent Application Publication No. 2003-070247.

DESCRIPTION OF EXEMPLARY EMBODIMENTS

Figure 1:
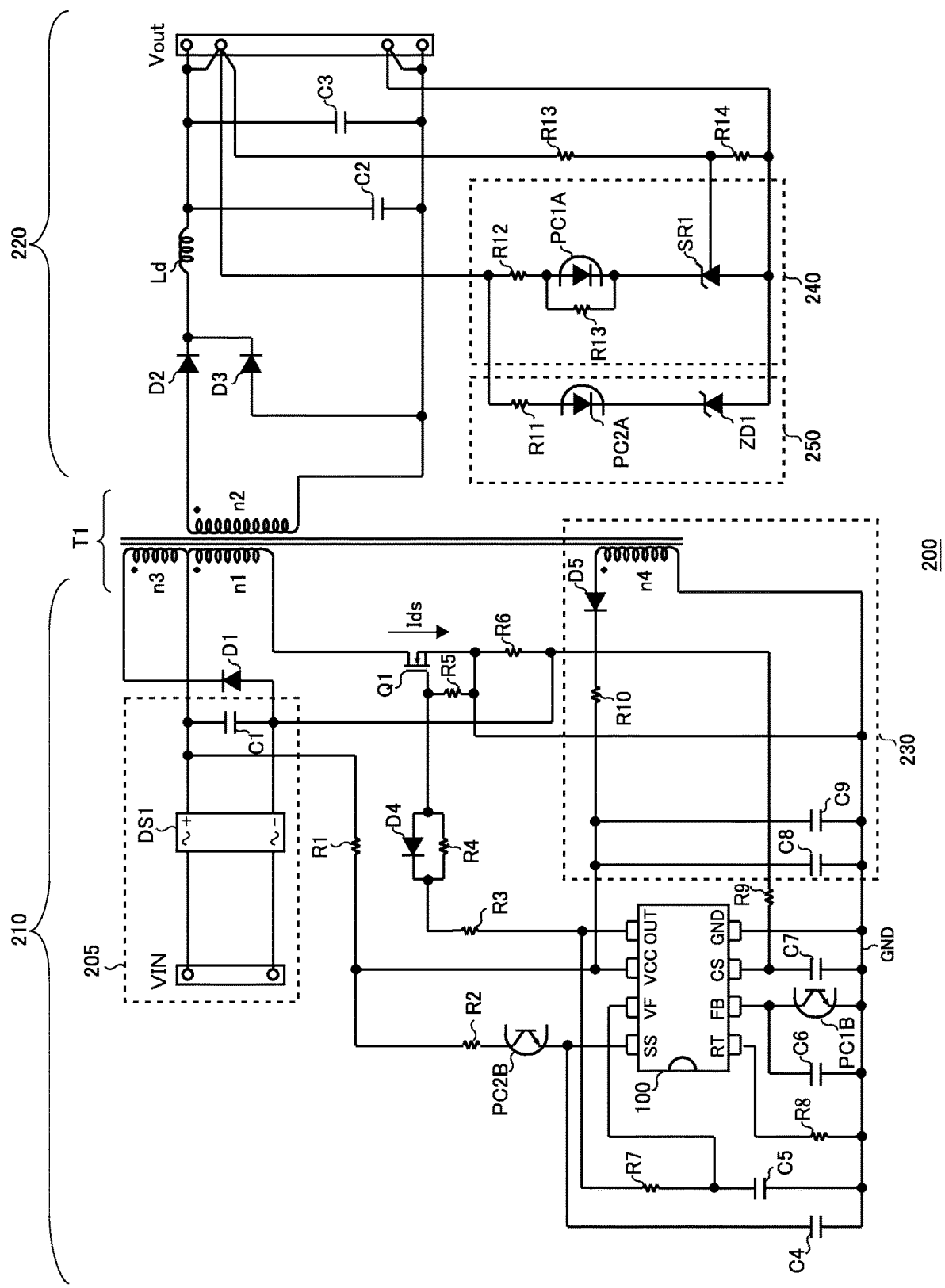
FIG. 1 shows an example of a switching power source 200 according to one embodiment of the present invention.

Hereinafter, the present invention will be described through embodiments of the invention, but the following embodiments do not limit the claimed invention. In addition, not all combinations of features described in the embodiments necessarily have to be essential to solving means of the invention. It should be noted that, in this specification and the drawings, the same reference numeral will be given to elements having substantially the same function and configuration to thereby leave out redundant explanation thereof, and illustration of elements that are not directly related to the present invention will be left out. Moreover, for elements having substantially the same function and configuration in one drawing, a reference numeral may be given to an element as a representative and may not be given to the others. When referred to as "same" or "equal" in this specification, it may include a case where there is an error caused by production tolerance or the like. Said error is, for example, within 10%.

FIG. 1 shows an example of a switching power source 200 according to one embodiment of the present invention. The switching power source 200 outputs a predetermined voltage or current by repeatedly controlling a switching element Q1 to an on-state and an off-state. The switching power source 200 in this example is provided with a primary-side circuit 210, a secondary-side circuit 220, and a transformer T1. The switching power source 200 shown in FIG. 1 is, but not limited to, a so-called forward-type circuit.

The primary-side circuit 210 may include a power source circuit 205. The power source circuit 205 supplies source power to the primary-side circuit 210. An external AC power source (a voltage VIN) such as a commercial power source may be connected to to the power source circuit 205 in this example. The power source circuit 205 may have a diode bridge DS1 and a capacitor C1 for rectifying and smoothing a voltage and a current from the AC power source.

The primary-side circuit 210 has a control circuit 100, a primary-side winding n1 of the transformer T1, a reset winding n3 of the transformer T1, a diode D1, and the switching element Q1. The primary-side winding n1 in this example is supplied with the source power from the power source circuit 205.

The secondary-side circuit 220 has a secondary-side winding n2 of the transformer T1, a diode D2, a diode D3, a secondary-side coil Ld, and one or more capacitors (a capacitor C2 and a capacitor C3 in FIG. 1). The secondary-side winding n2 is magnetically coupled to the primary-side winding n1.

The switching element Q1 is connected in series to the primary-side winding n1 and controls whether to pass a current through the primary-side winding n1. The switching element Q1 is, for example, a power MOSFET. The control circuit 100 controls the on-state and the off-state of the switching element Q1. The control circuit 100 may output a control signal to be inputted to a gate terminal of the switching element Q1. The control circuit 100 is, for example, an integrated circuit chip.

When the switching element Q1 is turned on and an exciting current flows through the primary-side winding n1, a load current according to a turn ratio flows through the secondary-side winding n2. The load current having flowed through the secondary-side winding n2 is rectified by the diode D2. In this example, the diode D2 is arranged between a high voltage-side terminal of the secondary-side winding n2 and the secondary-side coil Ld. The capacitors C2 and C3 are charged with the load current having passed through the secondary-side coil Ld. An output voltage Vout is applied to the load according to amounts of charge accumulated in the capacitors C2 and C3.

When the switching element Q1 is turned off, the current flowing through the primary-side winding n1 is interrupted, and an exciting current flows through the reset winding n3. Said exciting current flows from the diode D1 to the reset winding n3 and is regenerated to the high voltage-side of the power source circuit 205. When the switching element Q1 remains turned off, said exciting current gradually decreases. Moreover, the load current that was flowing through the secondary-side winding n2 is refluxed via the diode D3. In this example, the diode D3 is arranged between a low voltage-side terminal of the secondary-side winding n2 and the secondary-side coil Ld.

After the exciting current flowing through the reset winding n3 becomes 0, the exciting current flows from the low voltage side toward the high voltage side of the primary-side winding n1 with a parasitic capacitance of the switching element Q1 as a power source. When the parasitic capacitance is discharged, the diode D2 of the secondary-side circuit 220 is forward-biased to become conductive, and the exciting current flows through the secondary-side winding n2. Subsequently, the switching element Q1 is turned on, and the above-mentioned operation is repeated. A predetermined voltage and current are supplied to the load by causing a switching operation of the switching element Q1 in this way.

The primary-side circuit 210 may have a power source circuit 230 for supplying the source power to a power source terminal VCC of the control circuit 100. The power source circuit 230 may generate the source power based on a current generated through the switching operation of the switching element Q1. The power source circuit 230 in this example has an auxiliary winding n4, a diode D5, a resistor R10, and one or more capacitors (a capacitor C8 and a capacitor C9, in the example of FIG. 1).

The auxiliary winding n4 is arranged between a high voltage-side terminal of the power source circuit 205 and a GND line. A resistor R1 may be arranged between the auxiliary winding n4 and the power source circuit 205. The auxiliary winding n4 is magnetically coupled to the secondary-side winding n2. That is, a current according to a current of the secondary-side winding n2 flows through the auxiliary winding n4. The diode D5 is arranged between a high voltage-side terminal of the auxiliary winding n4 and the power source terminal VCC of the control circuit 100 and rectifies the current flowing through the auxiliary winding n4. The resistor R10 is arranged between the diode D5 and the power source terminal VCC. The capacitors C8 and C9 are charged with the current having passed through the diode D5. Electrical power accumulated in the capacitors C8 and C9 is supplied as the source power of the control circuit 100.

It should be noted that, at the time of activation when the switching operation of the switching element Q1 is not started, the capacitors C8 and C9 are charged via the resistor R1. When voltages of the capacitors C8 and C9 have risen to a predetermined starting voltage, the control circuit 100 is activated to cause the switching operation of the switching element Q1 to be started. After the switching element Q1 of the switching operation is started, the capacitors C8 and C9 are charged with the current from the auxiliary winding n4. However, when the switching operation of the switching element Q1 is stopped through protective operation or the like, the capacitors C8 and C9 are charged via the resistor R1. This allows the control circuit 100 to continuously operate.

The control circuit 100 has an OUT terminal that outputs a control signal for controlling the switching element Q1. The OUT terminal in this example is connected to the gate terminal of the switching element Q1 via a resistor R3. A gate resistance of the switching element Q1 can be adjusted by the resistor R3. A resistor R4 and a diode D4 may be provided between the resistor R3 and the gate terminal of the switching element Q1. The diode D4 is connected in parallel to the resistor R4. The diode D4 has an anode terminal connected to the gate terminal of the switching element Q1 and a cathode terminal connected to the resistor R3. Moreover, the gate terminal of the switching element Q1 may be connected to the GND line via a resistor R5. A reference potential line GND is connected to a GND terminal of the control circuit 100.

The primary-side circuit 210 may have a resistor R6 with one end connected to a source terminal of the switching element Q1 and the other end connected to a low voltage-side terminal of the power source circuit 205 (that is, to a common line of the primary-side circuit 210). Said other end of the resistor R6 is also connected to the reference potential line GND via a resistor R9 and a capacitor C7. The current having flowed through the primary-side winding n1 and the switching element Q1 flows to the low voltage side of the power source circuit 205 via the resistor R6.

The control circuit 100 has a CS terminal for sensing a magnitude of a principal current (a drain current Ids, in this example) flowing through the switching element Q1. The CS terminal takes in a potential of an end portion (the other end mentioned above) of the resistor R6. A connecting portion that takes said potential into the CS terminal may have a resistor R9 for connecting the CS terminal and the resistor R6 as well as a filter composed of a capacitor C7, as in the primary-side circuit 210 in this example. A potential of the other end portion (the one end connected to the switching element Q1, mentioned above) of the resistor R6 is inputted to the GND terminal of the control circuit 100 via the reference potential line GND. That is, a potential of the source terminal of the switching element Q1 and a potential of the GND terminal of the control circuit 100 are common. There is a potential difference generated according to a magnitude of the drain current Ids between the both end portions of the resistor R6. Accordingly, a potential difference between the GND terminal and the CS terminal indicates the magnitude of the drain current Ids. It should be noted that the potential of the CS terminal of the control circuit 100 in this example swings to the negative side with respect to the potential of the GND terminal according to the magnitude of the drain current Ids.

The control circuit 100 may have an FB terminal to which a signal indicating a magnitude of the output voltage Vout of the secondary-side circuit 220 is inputted. The secondary-side circuit 220 in this example is provided with a voltage detection unit 240 for detecting the magnitude of the output voltage Vout. The voltage detection unit 240 has a resistor R12, a light-emitting diode PC1A, a resistor R13, and a shunt regulator SR1. A control input end of the shunt regulator SR1 may be applied with a voltage obtained by dividing the output voltage Vout with the resistor R13 and a resistor R14. The shunt regulator SR1 draws a current if the voltage applied to the control input end is higher than a predetermined reference voltage, and does not draw a current if it is lower. That is, the shunt regulator SR1 operates such that the output voltage Vout becomes a value indicated by the following equation.

$$V\text{out} = \text{reference voltage}/(R14 \times (R13 + R14))$$

The resistor R12, the light-emitting diode PC1A, and the shunt regulator SR1 are provided in series between an output terminal for outputting the output voltage Vout and the reference potential. The resistor R13 is arranged in parallel with the light-emitting diode PC1A. The light-emitting diode PC1A carries a current according to the output voltage Vout therethrough and outputs light having intensity according to a magnitude of said current.

The primary-side circuit 210 has a light-receiving element such as a phototransistor PC1B for receiving the light outputted by the light-emitting diode PC1A. The phototransistor PC1B generates a current according to intensity of the received light. The phototransistor PC1B may be arranged between the FB terminal of the control circuit 100 and the GND line. As a result, the current according to the output voltage Vout flows through the FB terminal. The primary-side circuit 210 may have a capacitor C6 provided in parallel with the phototransistor PC1B. This can remove a high-frequency component of the current flowing through the FB terminal.

The control circuit 100 may have an SS terminal to which a signal indicating whether the output voltage Vout of the secondary-side circuit 220 is in an overvoltage state is inputted. The secondary-side circuit 220 in this example is provided with an overvoltage detection unit 250 for detecting whether the output voltage Vout is in an overvoltage state. The overvoltage detection unit 250 has a resistor R11, a light-emitting diode PC2A, and a zener diode ZD1.

The resistor R11, the light-emitting diode PC2A, and the zener diode ZD1 are provided in series between the output terminal for outputting the output voltage Vout and the reference potential. When the output voltage Vout has become equal to or higher than a reference voltage determined by a breakdown voltage of the zener diode ZD1, the zener diode ZD1 becomes conductive, and a current flows through the resistor R11 and the light-emitting diode PC2A. The light-emitting diode PC2A emits light according to the current.

The primary-side circuit 210 has a light-receiving element such as a phototransistor PC2B for receiving the light outputted by the light-emitting diode PC2A. The phototransistor PC2B generates a current according to intensity of the received light. The phototransistor PC2B may be arranged between the SS terminal of the control circuit 100 and the resistor R1. Moreover, the resistor R2 may be arranged between the resistor R1 and the phototransistor PC2B. When the output voltage Vout is brought into an overvoltage state and a current flows through the phototransistor PC2B, a predetermined voltage is applied to the SS terminal. Moreover, a capacitor C4 may be arranged between the SS terminal and the GND line.

The control circuit 100 may have an RT terminal. The RT terminal may be connected to the GND line via a resistor R8. The RT terminal is controlled to have a constant voltage, and a frequency of an oscillation signal mentioned later is controlled by a current flowing through the resistor R8.

The control circuit 100 may have a VF terminal. A signal for controlling a frequency of an oscillation signal at the time of current drooping mentioned later is inputted to the VF terminal. The VF terminal may be connected to the OUT terminal via a resistor R7. Moreover, the VF terminal may be connected to the GND line via a capacitor C5.

Figure 2:
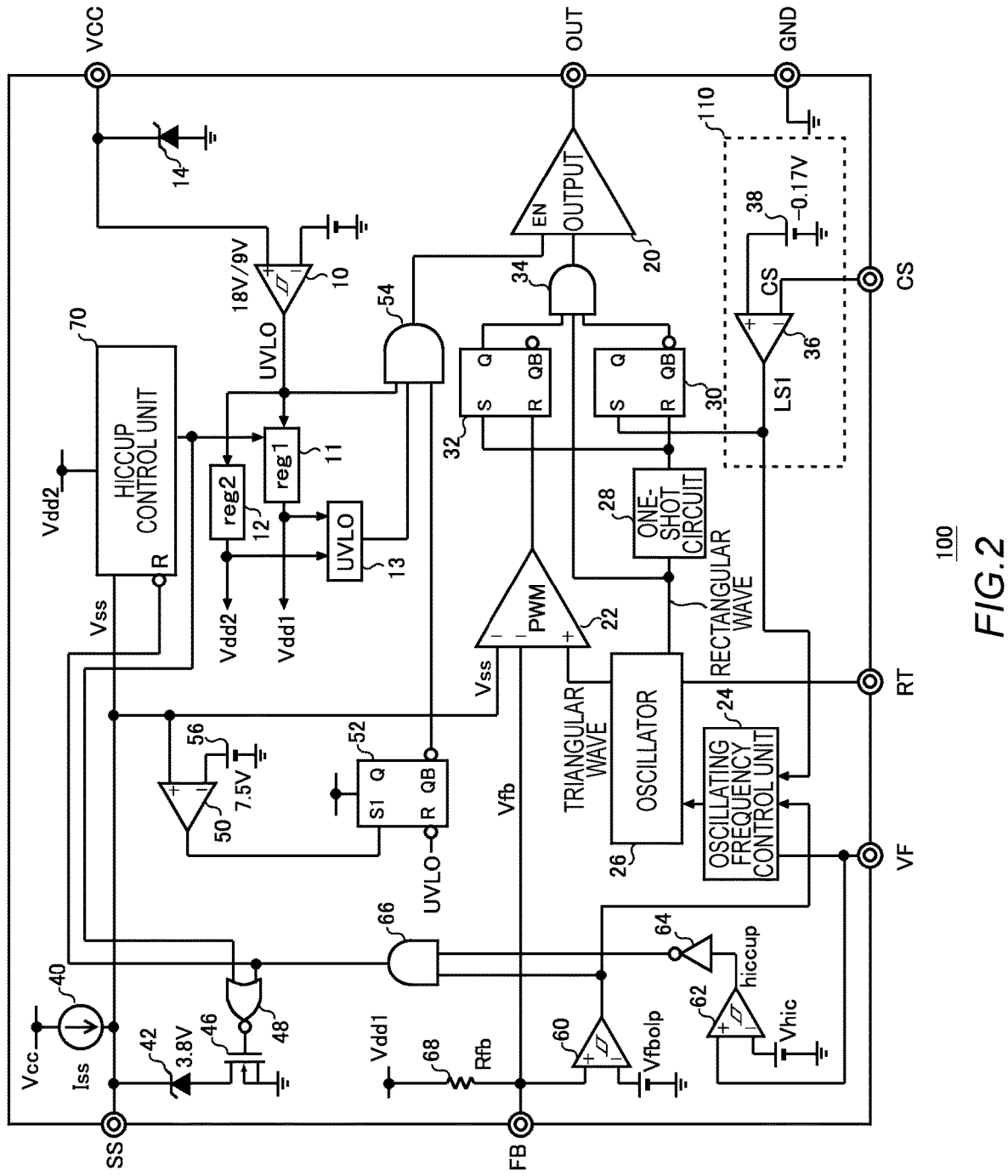
FIG. 2 shows a configuration of a control circuit 100 according to a reference example.

FIG. 2 shows a configuration of a control circuit 100 according to a reference example. The control circuit 100 in this example has an internal power source 11 and an internal power source 12 for generating internal voltages based on electrical power supplied from a VCC terminal. The internal power source 11 generates a voltage Vdd1 and the internal power source 12 generates a voltage Vdd2. The voltage Vdd1 and the voltage Vdd2 may have the same voltage value. The voltage Vdd1 and the voltage Vdd2 are, for example, 5 V. Each circuit included in the control circuit 100 receives source power from either the internal power source 11 or the internal power source 12. The two internal power sources are provided, so that shutting down one of the internal power sources in case of abnormality or the like can selectively stop each circuit included in the control circuit 100.

The control circuit 100 in this example has a protective diode 14, a hysteresis circuit 10, and a protective circuit 13. The protective diode 14 clamps a VCC voltage such that a voltage at the VCC terminal does not become equal to or higher than a predetermined voltage.

The hysteresis circuit 10 monitors whether the voltage at the VCC terminal has become a low voltage equal to or lower than a predetermined value. The hysteresis circuit 10 outputs a protective signal UVLO that becomes an L level when the VCC voltage has been brought into a low-voltage state and that becomes an H level when the VCC voltage has become a predetermined high voltage. When the protective signal UVLO is the L level, a voltage at the gate terminal of the switching element Q1 is fixed to the L level. This prevents the switching operation of the switching element Q1 from being caused when the VCC voltage is a low voltage. As an example, the hysteresis circuit 10 may set the protective signal UVLO as the L level when the VCC voltage has become 9 V or lower. Moreover, the hysteresis circuit 10 may transition the protective signal UVLO from the L level to the H level when the VCC voltage has become 18 V or higher. For example, when the gradually rising VCC voltage has become 18 V or higher in case where the switching power source 200 is activated or reactivated, the hysteresis circuit 10 sets the protective signal UVLO as the H level.

The protective circuit 13 monitors the internal voltages generated by the internal power source 11 and the internal power source 12. The protective circuit 13 stops the switching operation of the switching element Q1 when one of the internal voltages has fallen out of a preset allowable range.

The control circuit 100 is provided with a PWM circuit 22, an oscillating frequency control unit 24, an oscillator 26, a control pulse generation unit 32, an AND circuit 34, and a control signal output unit 20. The control signal output unit 20 outputs, in response to an inputted control pulse, a control signal for controlling the switching element Q1. The control signal output unit 20 makes the output by level-shifting the control pulse to a signal from 0 V to the VCC voltage. That is, the control signal output unit 20 outputs 0 V when the control pulse indicates the L level, and outputs the VCC voltage when it indicates the H level. The switching element Q1 is turned off when the control signal is 0 V, and the switching element Q1 is turned on when the control signal is the VCC voltage.

It should be noted that the control signal output unit 20 outputs 0 V regardless of the control pulse while an L-level signal is inputted to an enable terminal. The hysteresis circuit 10 and the protective circuit 13 mentioned above stop the switching operation of the switching element Q1 by inputting the L-level signal to the enable terminal of the control signal output unit 20.

The PWM circuit 22, the oscillator 26, and the control pulse generation unit 32 generate the control pulse. The oscillator 26 generates an oscillation signal for defining a cycle of the control pulse. The oscillating frequency control unit 24 controls a frequency of the oscillation signal. The oscillator 26 may generate a triangular-wave signal and a rectangular-wave signal as the oscillation signal. A period of the oscillation signal may be set by a resistance value of the resistor R8 connected to the RT terminal. The triangular-wave signal and the rectangular-wave signal are synchronized. In this example, a signal level of the triangular-wave signal increases during a time period when the rectangular-wave signal is the H level, and the signal level of the triangular-wave signal decreases during a time period when the rectangular-wave signal is the L level.

The PWM circuit 22 compares a Vfb voltage at the FB terminal and the signal level of the triangular-wave signal. The PWM circuit 22 in this example outputs the H level during a time period when a voltage of the triangular-wave signal has exceeded the Vfb voltage, and outputs the L level during a time period when the voltage of the triangular-wave signal is equal to or lower than the Vfb voltage.

A resistor 68 is provided between the FB terminal and a high potential (the Vdd1). As mentioned above, the current according to the output voltage Vout flows through the FB terminal. Said current flows through the resistor 68, so that the Vfb voltage, a voltage at the FB terminal is determined by a resistance value Rfb of the resistor 68 and a value of said current. In this example, the Vfb voltage decreases when the output voltage Vout increases, and the Vfb voltage increases when the output voltage Vout decreases.

The control pulse generation unit 32 generates a pulse in each cycle of the oscillation signal generated by the oscillator 26. The control pulse generation unit 32 in this example is a set-reset flip-flop. An output of the control pulse generation unit 32 transitions to the H level in response to a rise of a rectangular wave outputted by the oscillator 26. The control circuit 100 may have a one-shot circuit 28 for generating a one-shot pulse having a pulse width shorter than that of the rectangular-wave signal in response to a rising edge of the oscillation signal (the rectangular-wave signal). The one-shot pulse may be inputted to a set terminal of the control pulse generation unit 32.

The output of the control pulse generation unit 32 transitions to the L level when a signal outputted by the PWM circuit has become the H level. That is, the control pulse generation unit 32 outputs the H level during a time period from a timing of the rising edge of the oscillation signal to a timing when the voltage of the triangular-wave signal exceeds the Vfb voltage. As a result, the control pulse generation unit 32 outputs the control pulse whose pulse width has been adjusted according to a level of the Vfb voltage in each cycle of the oscillation signal.

The control pulse in this example has a larger pulse width as the Vfb voltage is higher (that is, the output voltage Vout is lower), and has a smaller pulse width as the Vfb voltage is lower (that is, the output voltage Vout is higher). This suppresses fluctuation of the output voltage Vout.

The AND circuit 34 may input, to the control signal output unit 20, an AND of the output of the control pulse generation unit 32 and the oscillation signal (the rectangular-wave signal). This allows the pulse width of the rectangular-wave signal to define an upper limit of the pulse width of each pulse of the control pulse. The AND circuit 34 may input, to the control signal output unit 20, an AND of the output of the control pulse generation unit 32, the oscillation signal (the rectangular-wave signal), and an inversion output of a set-reset circuit 30.

The control circuit 100 has a first protection unit 110. When the drain current Ids flowing through the switching element Q1 has exceeded a first threshold value, the first protection unit 110 turns off the switching element Q1 to stop the drain current Ids. The first protection unit 110 may adjust at least one of an on-time period and an off-time period of the switching element Q1 to stop the drain current Ids. When the drain current Ids flowing through the switching element Q1 has exceeded the first threshold value, the first protection unit 110 in this example shortens an on-time period of the control pulse in said cycle of the oscillation signal. To be more specific, the first protection unit 110 shortens the on-time period, by interrupting the control pulse in said cycle to bring it to the L level. This can suppress an excessive current from flowing through the switching element Q1. A current detecting signal CS indicating the magnitude of the drain current Ids is inputted to the first protection unit 110 from the CS terminal. The current detecting signal CS in this example is a signal of a negative voltage whose absolute value is larger as the drain current Ids is larger.

The first protection unit 110 has a voltage comparison unit 36 and a reference voltage generation unit 38. The reference voltage generation unit 38 generates a reference voltage corresponding to the above-mentioned first threshold value. The reference voltage in the example of FIG. 2 is −0.17 V. The voltage comparison unit 36 compares the current detecting signal CS and the reference voltage. The voltage comparison unit 36 outputs an H-level current limiting signal LS1 when the current detecting signal CS is lower than the reference voltage (when an absolute value of the current detecting signal CS is larger than an absolute value of the reference voltage, in this example), and outputs an L-level current limiting signal LS1 when the current detecting signal CS is equal to or higher than the reference voltage (when the absolute value of the current detecting signal CS is equal to or smaller than the absolute value of the reference voltage, in this example).

The current limiting signal LS1 outputted by the voltage comparison unit 36 is inputted to a set terminal of the set-reset circuit 30. The one-shot pulse outputted by the one-shot circuit 28 is inputted to a reset terminal of the set-reset circuit 30. That is, the set-reset circuit 30 outputs the L-level signal until the one-shot pulse of the next cycle is inputted after an overcurrent is detected in the first protection unit 110. When the set-reset circuit 30 outputs the L-level signal, the control pulse in said cycle is interrupted by the AND circuit 34, and the switching element Q1 is turned off. This can shorten the on-time period in said cycle and suppress an increase in the drain current Ids.

The oscillating frequency control unit 24 in this example lengthens the period of the oscillation signal (that is, reduces the frequency) during a time period when the current limiting signal LS1 indicates the H level, as compared to a time period when it indicates the L level. This can reduce a switching frequency of the switching element Q1 when an overcurrent state is detected by the first protection unit 110.

The oscillating frequency control unit 24 may control, based on a voltage at the VF terminal, the frequency of the oscillation signal for when the overcurrent is detected. The voltage at the VF terminal can be adjusted by the resistor R7 connected to the VF terminal. A resistance value of the resistor R7 can be appropriately adjusted by a user or the like.

Moreover, a Vss voltage of the SS terminal may be inputted to the PWM circuit 22. The PWM circuit 22 may compare the lower of the Vss voltage and the Vfb voltage with the triangular-wave signal. The current Iss flows from the current source 40 to the SS terminal. When the switching power source 200 is activated, the capacitor C4 connected to the SS terminal is charged with the current Iss, and the Vss voltage gradually rises. During a time period when the Vss voltage is lower than the Vfb voltage, the PWM circuit 22 compares the Vss voltage and the triangular-wave signal, so that the pulse width of the control pulse gradually increases in accordance with the Vss voltage. This can gradually increase the drain current Ids when the switching power source 200 is activated, to make a soft-start.

The control circuit 100 may have a zener diode 42 provided between the SS terminal and a GND potential. As a result, the Vss voltage is clamped to a breakdown voltage of the zener diode. The clamp voltage in this example is 3.8 V. The control circuit 100 may have a transistor 46 provided in series with the zener diode 42. The Vss voltage is clamped by turning on the transistor 46. The Vss voltage can be unclamped by turning off the transistor 46. The control circuit 100 may have an OR circuit 48 for controlling the transistor 46.

The control circuit 100 may have a comparison circuit 50, a power source 56, a protective circuit 52, and an AND circuit 54. The protective circuit 52 stops the switching operation of the switching element Q1 when the Vss voltage has become equal to or higher than a predetermined reference value.

The power source 56 generates the reference voltage. The reference voltage in this example is 7.5 V. The comparison circuit 50 outputs the H level when the Vss voltage has exceeded the reference voltage, and outputs the L level when the Vss voltage is equal to or lower than the reference voltage. The protective circuit 52 in this example is a set-reset flip-flop having a first set terminal S1 to which the output of the comparison circuit 50 is inputted. An inversion output QB of the protective circuit 52 becomes the L level when the output of the comparison circuit 50 has become the H level.

The AND circuit 54 inputs the L-level signal to an enable terminal EN of the control signal output unit 20 when an output of the protective circuit 52 has become the L level. As a result, the switching operation of the switching element Q1 is stopped.

An inversion signal of the protective signal UVLO is inputted to a reset terminal of the protective circuit 52. That is, an output Q of the protective circuit 52 is reset when the protective signal UVLO has transitioned to the L level. In this case, the inversion output QB of the protective circuit 52 becomes the H level. The protective circuit 52 in this example stops the switching operation of the switching element Q1 until the switching power source 200 is reactivated and the protective signal UVLO transitions to the L level after an overvoltage is detected by the phototransistor PC2B.

The protective signal UVLO and an output of the protective circuit 13 may be inputted to the AND circuit 54. The AND circuit 54 may output an AND of the output of the protective circuit 52, the protective signal UVLO, and the output of the protective circuit 13. That is, the AND circuit 54 may stop the switching operation of the switching element Q1 when an abnormality is detected in one of the protective circuit 52, the protective circuit 13, and the hysteresis circuit 10.

Moreover, the oscillating frequency control unit 24 may also reduce the frequency of the oscillation signal when the Vfb voltage of the FB terminal has become an overvoltage equal to or higher than a predetermined Vfbolp voltage. The control circuit 100 may have a voltage comparator 60 for comparing the Vfb voltage and the Vfbolp voltage.

The control circuit 100 may have an AND circuit 66, a hiccup comparator 62, and an inverter 64. The hiccup comparator 62 outputs the L level when the voltage at the VF terminal has become equal to or lower than a predetermined voltage Vhic. The inverter 64 inverts the output of the hiccup comparator 62 to output it.

The AND circuit 66 outputs the H level while the voltage comparator 60 has detected the overvoltage (that is, the output of the voltage comparator 60 is the H level) and when the output of the inverter 64 is the H level. When the output of the AND circuit 66 has become the H level, the transistor 46 is controlled to the off-state via the OR circuit 48, and the Vss voltage is unclamped.

The control circuit 100 may have a hiccup control unit 70. The hiccup control unit 70 performs a hiccup operation when the AND circuit 66 has output the H level. The hiccup operation will be mentioned later. Moreover, the hiccup control unit 70 may stop the operation of the internal power source 11 when performing the hiccup operation. The hiccup control unit 70 may control the transistor 46 to the off-state via the OR circuit 48 when performing the hiccup operation.

Figure 3:
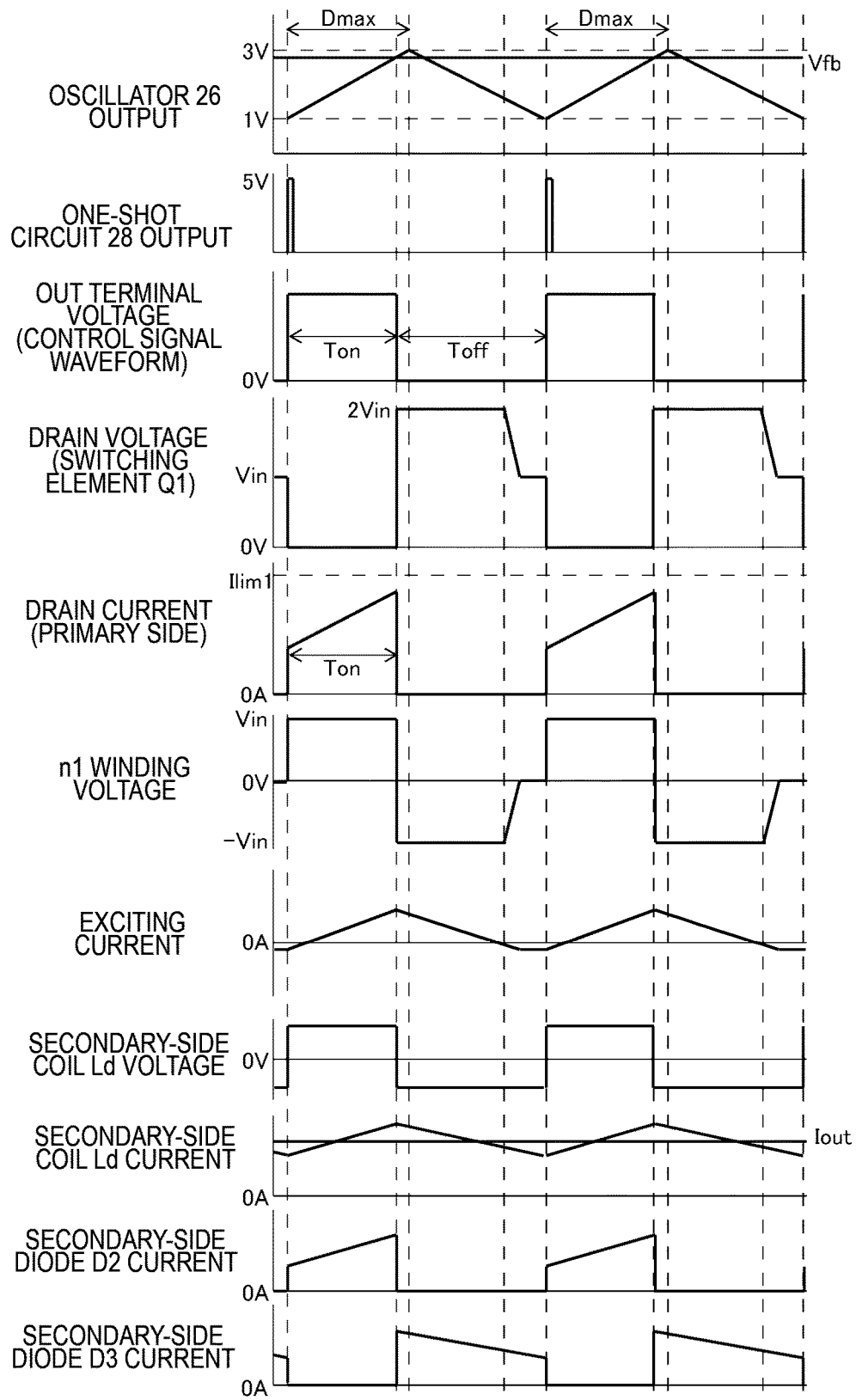
FIG. 3 is a timing chart explaining an operation example of the switching power source 200 described with reference to FIG. 1 and FIG. 2.

FIG. 3 is a timing chart explaining an operation example of the switching power source 200 described with reference to FIG. 1 and FIG. 2. The oscillator 26 in this example generates a triangular-wave signal transitioning between 1 V and 3 V. Moreover, the oscillator 26 outputs a rectangular-wave signal (not illustrated) synchronized with the triangular-wave signal. The rectangular-wave signal becomes the H level during a time period Dmax when the triangular-wave signal is rising, and becomes the L level during a time period when the triangular-wave signal is falling. Moreover, FIG. 3 shows the Vfb voltage together with the triangular-wave signal. The PWM circuit 22 outputs the H level during a time period when a voltage of the triangular-wave signal has exceeded the Vfb voltage, and outputs the L level during a time period when the voltage of the triangular-wave signal is equal to or lower than the Vfb voltage.

The one-shot circuit 28 outputs a short one-shot pulse at a start timing of each cycle of the oscillation signal (the triangular-wave signal and the rectangular-wave signal). The control pulse generation unit 32 outputs a control pulse having a pulse width from a timing when the one-shot pulse is inputted to a timing when the voltage of the triangular-wave signal exceeds the Vfb voltage. An OUT terminal voltage has a similar waveform to that of said control pulse. The switching element Q1 is turned on during a time period Ton when the OUT terminal voltage is the H level, and the switching element Q1 is turned off during a time period Toff when the OUT terminal voltage is the L level.

During the time period Ton, the switching element Q1 is turned on, so that the drain voltage becomes 0 V. During the time period Toff, the switching element Q1 is turned off, so that the drain voltage rises. Moreover, the drain current rises during the time period Ton, and the drain current becomes 0 during the time period Toff. FIG. 3 shows an operation of a load equal to or smaller than a rated load. The drain current in this example transitions in a range smaller than a first threshold value Ilim 1, and the first protection unit 110 does not detect an overcurrent.

In FIG. 3, the voltage outputted by the power source circuit 205 is defined as Vin. Immediately after the transition from the time period Ton to Toff, the current that was flowing through the primary-side winding n1 flows through the reset winding n3. In this example, the numbers of windings of the primary-side winding n1 and the reset winding n3 are the same. Therefore, the drain voltage rises to 2×Vin.

The exciting current flowing through the primary-side winding n1 increases during the on-time period Ton of the switching element Q1, and it decreases during the off-time period Toff. In the forward-type power source as shown in FIG. 1, setting is made such that the on-time period Ton<the off-time period Toff. In this example, Ton is 46% of Ton+Toff. A ratio of Ton to Ton+Toff is referred to as an on-duty. The exciting current is reset to 0 by a starting time point of each cycle. As shown in FIG. 3, at a timing when the exciting current becomes 0, a voltage of the primary-side winding n1 starts to return to 0 V, and the drain voltage decreases to Vin.

The load current flows through the secondary-side winding n2 according to the exciting current of the primary-side winding n1. A voltage and a current of the secondary-side coil Ld change according to the load current. During the time period Ton, the current flowing through the secondary-side winding n2 is rectified by the diode D2. During the time period Toff, the load current is refluxed to the diode D3.

The forward-type power source has a large L value of the transformer T1 and operates in a current continuous mode. The output voltage Vout of the switching power source 200 is as shown in the following equation. Vout=Vin×(n2/n1)×on-duty Even if the load current flowing to the secondary side changes, the on-duty and the Vfb voltage are almost constant with only a slight change, and a DC offset component in the current continuous mode changes and adjustment is made.

Figure 4A:
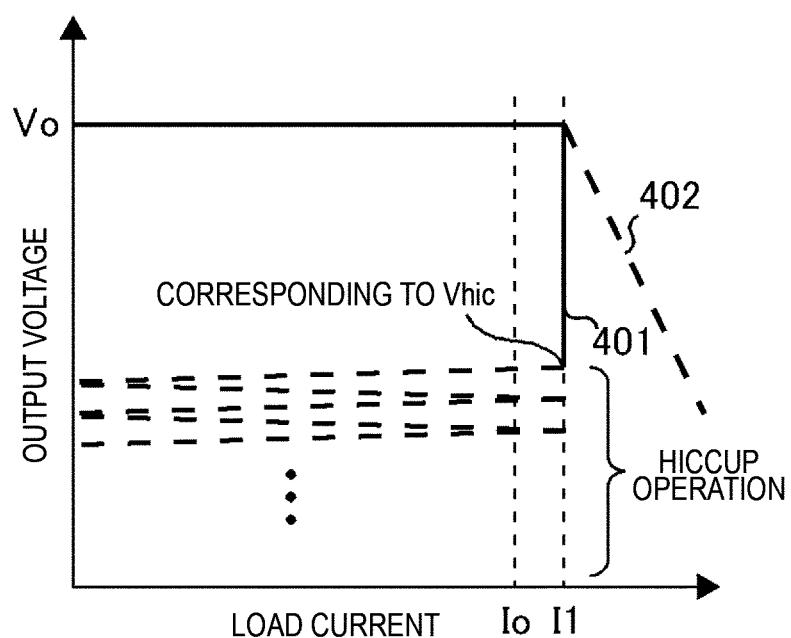
FIG. 4A shows a relationship between an output voltage Vout and a load current.
Figure 4B:
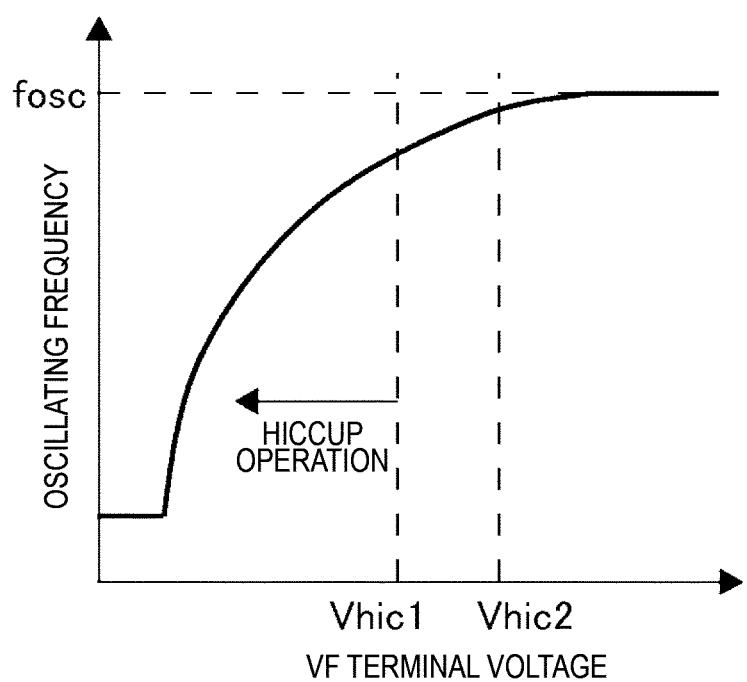
FIG. 4B shows a relationship between a VF terminal voltage and an oscillating frequency.
Figure 5:
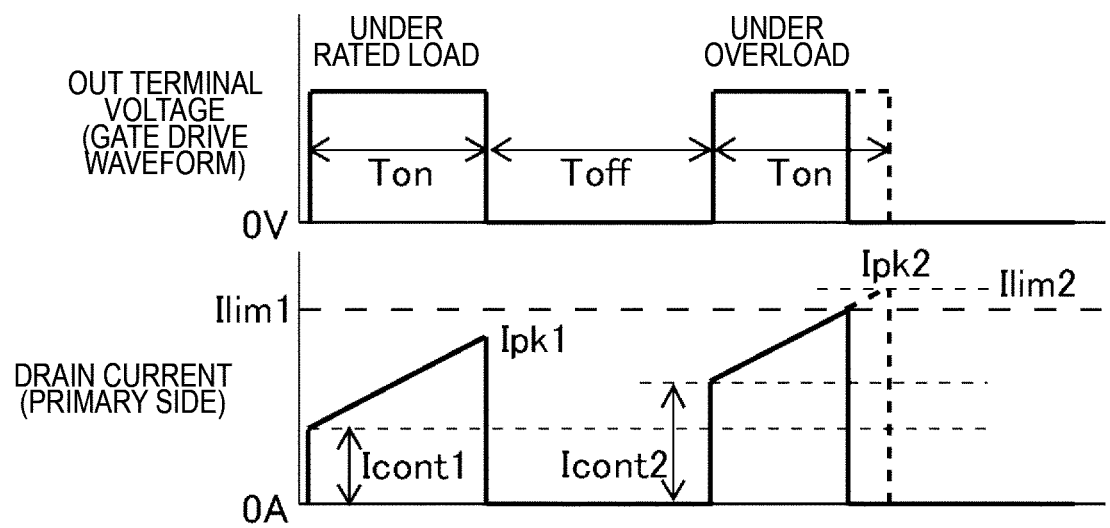
FIG. 5 shows waveforms under rated load and under overload of an OUT terminal voltage (a voltage of a control signal applied to a switching element Q1) and a drain current Ids of the switching element Q1.

FIG. 4A shows a relationship between an output voltage Vout and a load current. FIG. 4B shows a relationship between a VF terminal voltage and an oscillating frequency. FIG. 5 shows waveforms under rated load and under overload of an OUT terminal voltage (a voltage of a control signal applied to a switching element Q1) and a drain current Ids of the switching element Q1.

In the forward-type power source, the output voltage Vout is set by a turn ratio of the primary-side winding n1 and the secondary-side winding n2 as well as the on-duty. As the load current increases, while the on-duty remains constant, there is an increase in a value (Icont 1 in FIG. 5) of the drain current Ids flowing through the switching element Q1 in the current continuous mode, and a decrease in a level of the current detecting signal CS of the CS terminal.

When the load current has exceeded a rated current Io to increase to I1, the drain current Ids in the current continuous mode must increase to Icont 2 and a peak current of the drain current Ids must increase to Ipk2 in order to keep the on-duty constant. However, at a time point where the drain current Ids has risen to the first threshold value Ilim 1, the first protection unit 110 decreases the on-duty of the switching element Q1. Therefore, the output voltage Vout starts to decrease. As the load current further increases, while a peak value of the drain current Ids remains constant, the current flowing in the current continuous mode further increases, and the on-duty further decreases. As a result, the output voltage Vout decreases. Moreover, when the drain current Ids increases and the on-duty decreases, the voltage at the VF terminal decreases. In this case, the control circuit 100 decreases the oscillating frequency as shown in FIG. 4B.

When simply performing a current limiting operation only, as indicated by a waveform 402 in FIG. 4A, the waveform is such that, from a point of the output voltage Vout and the load current I1, the output voltage Vout decreases while the load current gradually increases. As indicated by a waveform 401, the switching power source 200, from the point of the output voltage Vout and the load current I1, decreases the output voltage Vout without increasing the load current I1. The switching power source 200 in this example smooths a control signal (the OUT terminal voltage) applied to the VF terminal of the control circuit 100 with the capacitor C5 and the resistor R7.

The oscillating frequency control unit 24 of the control circuit 100 decreases the oscillating frequency of the oscillator 26 when the voltage at the VF terminal decreases. As a result, the frequency of the oscillation signal decreases as the on-duty becomes smaller, which can suppress electrical power sent to the secondary-side circuit 220. Therefore, a current drooping characteristic as indicated by the waveform 401 can be realized under overload.

When the voltage at the VF terminal further decreases to be lower than a Vhic1 voltage, the hiccup control unit 70 performs a hiccup operation of operating the switching element Q1 for a certain time period and stopping the switching element Q1 for a certain time period. The hiccup control unit 70 may count oscillation of the voltage at the SS terminal or the like, to measure said time period. Through the hiccup operation, the load current flows intermittently as indicated by dashed lines in FIG. 4A. The control circuit 100 may terminate the hiccup operation when the voltage at the VF terminal has exceeded a Vhic2 voltage. Here, the Vhic in FIG. 4A corresponds to the Vhic 1 voltage or the Vhic2 voltage. If the voltage at the VF terminal decreases from a high potential, the hiccup operation is performed when the Vhic has become equal to or lower than Vhic1 voltage. If the voltage at the VF terminal rises from a low potential, the hiccup operation is stopped when the Vhic has become equal to or higher than the Vhic2 voltage.

In the control circuit 100 described with reference to FIG. 1 to FIG. 5, overcurrent control is performed by the first protection unit 110. However, if the overcurrent control by the first protection unit 110 no longer works for some reason, the drain current Ids becomes excessive, which causes a failure or the like. Particularly, when a current drooping function under overload is provided, it is assumed that the peak current of the drain current Ids constantly reaches a limiting value. If the overcurrent control no longer works in such a case, the drain current Ids is likely to become excessive.

Figure 6:
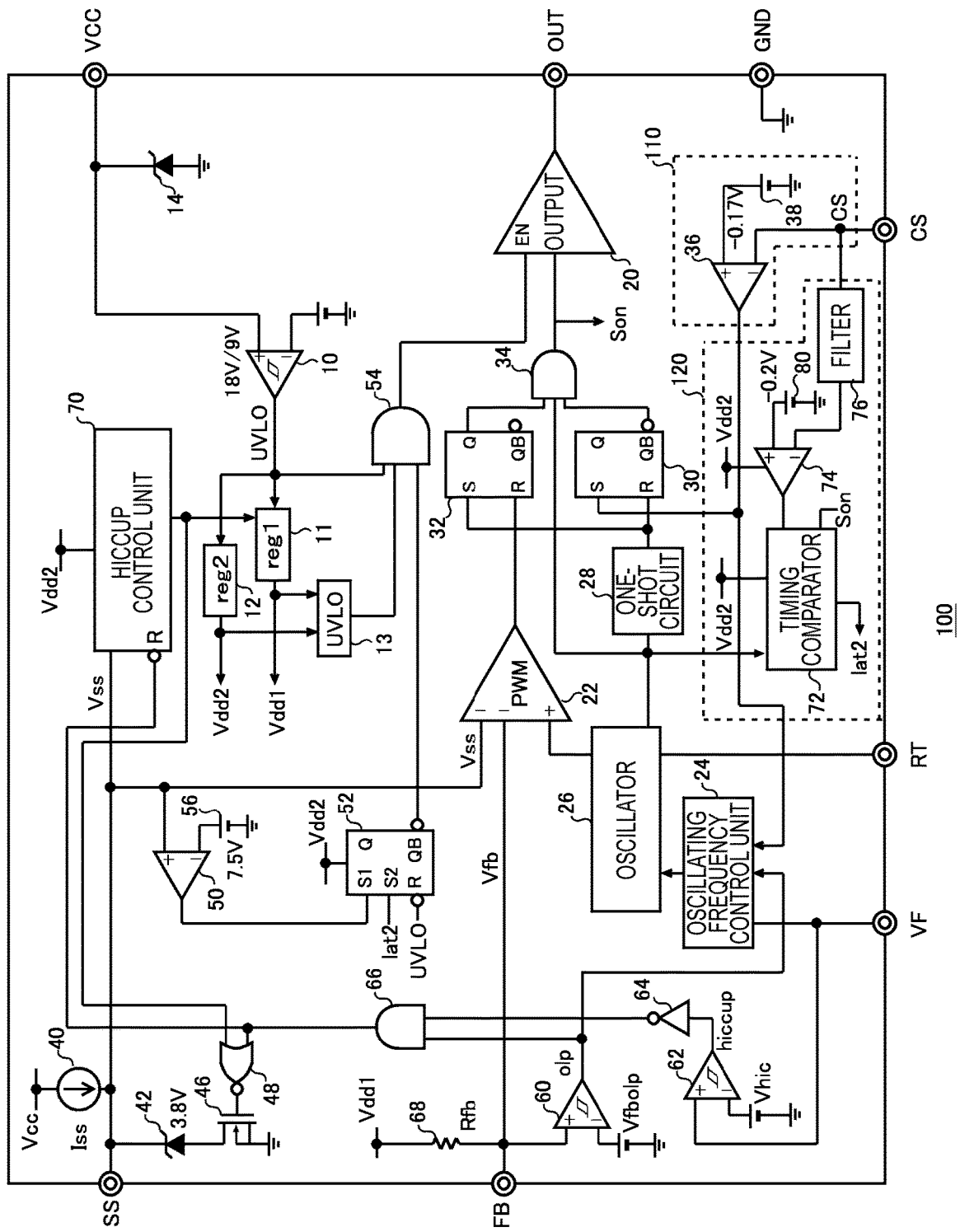
FIG. 6 shows a configuration example of the control circuit 100 according to an embodiment example.

FIG. 6 shows a configuration example of the control circuit 100 according to an embodiment example. The control circuit 100 in this example further has a second protection unit 120 with respect to a configuration of the control circuit 100 shown in FIG. 2. As for the other structures, it is similar to the control circuit 100 shown in FIG. 2 unless otherwise described.

When the drain current Ids of the switching element Q1 has exceeded a second threshold value larger than the first threshold value in the first protection unit 110, the second protection unit 120 stops the drain current Ids of the switching element Q1 over a longer time period than the first protection unit 110. The first protection unit 110 adjusts the on-time period of the switching element Q1 in one cycle of the oscillation signal, whereas the second protection unit 120 in this example fixes the switching element Q1 to the off-state to interrupt the drain current Ids, over a plurality of cycles of the oscillation signal, when the drain current Ids has exceeded the second threshold value. To be specific, the second protection unit 120 fixes the switching element Q1 to the off-state by inputting an H-level signal lat2 to a second set terminal S2 of the protective circuit 52.

When the second protection unit 120 outputs the H-level signal lat2, the inversion output QB of the protective circuit 52 is set to the L level. Then, the inversion output QB of the protective circuit 52 is maintained until the protective signal UVLO transitions to the L level. As a result, when the drain current Ids has exceeded the second threshold value, the output of the control signal output unit 20 is fixed to an off-level over a plurality of cycles of the oscillation signal.

When a level of a signal Son for controlling the switching element Q1 to the on-state or the off-state is an on-level for controlling the switching element Q1 to the on-state and the drain current Ids has exceeded the second threshold value, the second protection unit 120 fixes the switching element Q1 to the off-state. The signal Son in this example is a control pulse outputted by the AND circuit 34. In this example, the second protection unit 120 executes the overcurrent control, with the control pulse indicating the H level. This allows the second protection unit 120 to suppress the overcurrent even when the overcurrent control by the first protection unit 110 does not work and the signal Son is the H level. It should be noted that the signal Son is not limited to the control pulse outputted by the AND circuit 34. For example, the control signal outputted by the control signal output unit 20 may be detected as the signal Son. Moreover, the signal inputted by the set-reset circuit 30 to the AND circuit 34 may be defined as the signal Son.

The second protection unit 120 in this example has an overcurrent detection unit 74, a timing comparator 72, a power source 80, and a delay unit 76. The overcurrent detection unit 74 detects the overcurrent state where the drain current Ids has exceeded the second threshold value. A voltage generated by the power source 80 is inputted to the overcurrent detection unit 74 in this example as the second threshold value. The power source 80 in this example generates −0.2 V. An absolute value of the second threshold value is set slightly larger than an absolute value of the first threshold value. For example, the absolute value of the second threshold value may be 1.1 times or more and 1.2 times or less of the absolute value of the first threshold value. The overcurrent detection unit 74 outputs the H-level signal when the current detecting signal CS inputted from the CS terminal is lower than the second threshold value (that is, when the absolute value of the current detecting signal CS has exceeded the absolute value of the second threshold value).

The timing comparator 72 monitors a timing when the the level of the signal Son changes and a timing when a level of an output signal of the overcurrent detection unit 74 changes. The timing comparator 72 outputs an H-level lat signal when the output signal of the overcurrent detection unit 74 has transitioned to the H level before the signal Son transitions from the on-level to the off-level. As a result, the inversion output QB of the protective circuit 52 is set to the L level, and the switching operation of the switching element Q1 is stopped. It should be noted that monitoring the signal Son by the timing comparator 72 can prevent overcurrent suppression by the second protection unit 120 from being conducted when the first protection unit 110 is functioning normally. The overcurrent suppression by the second protection unit 120 is conducted over a longer time period than overcurrent suppression by the first protection unit 110, so that monitoring the signal Son can avoid excessive current suppression by the second protection unit 120.

The current detecting signal CS indicating the magnitude of the drain current Ids is inputted to the first protection unit 110 and the second protection unit 120. The delay unit 76 delays the current detecting signal CS to input it to the overcurrent detection unit 74. For example, the delay unit 76 is a filter for removing a high-frequency component of the current detecting signal CS. The delay unit 76 may delay the current detecting signal CS by other means.

Providing the delay unit 76 can prioritize current suppression by the first protection unit 110 over current suppression by the second protection unit 120. This can avoid the excessive current suppression by the second protection unit 120. A delay time in the delay unit 76 is preferably longer than an operation time of the first protection unit 110. The operation time of the first protection unit 110 refers to a time from when the current detecting signal CS indicating that the drain current Ids exceeding the first threshold value has flowed is inputted to the first protection unit 110 to when the first protection unit 110 stops the drain current Ids. Said operation time may be a time from when the current detecting signal CS indicating the overcurrent is inputted to the first protection unit 110 to when the signal Son transitions to the L level.

Figure 7:
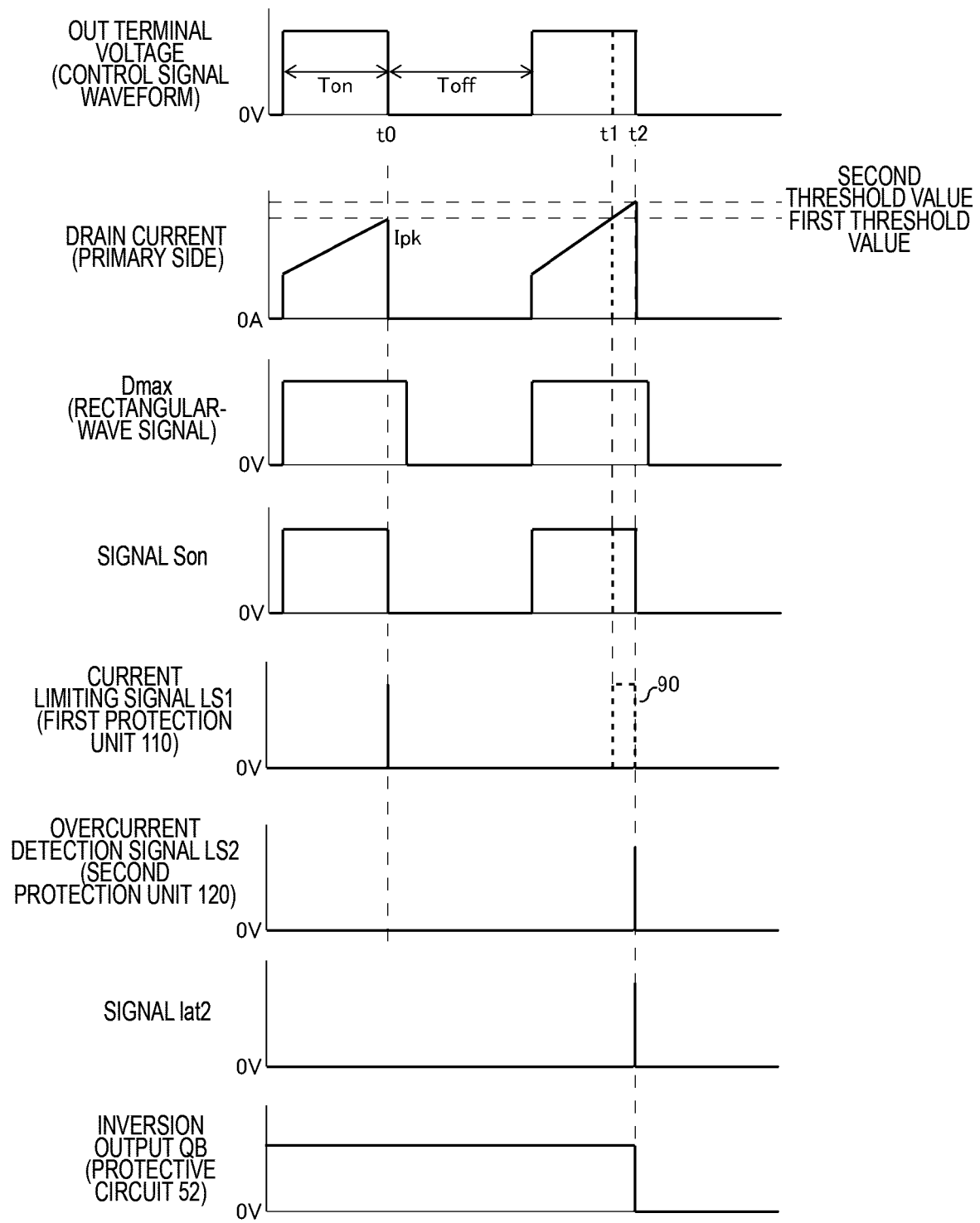
FIG. 7 shows an operation example of the switching power source 200 using the control circuit 100 shown in FIG. 6.

FIG. 7 shows an operation example of the switching power source 200 using the control circuit 100 shown in FIG. 6. In this example, each signal waveform under overload is shown. It should be noted that it may be similar to the signal waveform shown in FIG. 3 except for the signal waveform shown in FIG. 7.

When the drain current Ids has increased to exceed the first threshold value (a time t0), the first protection unit 110 outputs the H-level current limiting signal LS1. As a result, the control signal becomes the L level and the drain current Ids is interrupted. When the current suppression by the first protection unit 110 is working in this way, the signal Son also transitions to the L level.

In this example, the drain current Ids has also increased to exceed the first threshold value at a time t1. In the switching power source 200 having the above-mentioned current drooping characteristic, the drain current Ids exceeds the first threshold value in almost all cycles under overload. When the current suppression by the first protection unit 110 is working, as indicated by a dashed line in each signal waveform, the first protection unit 110 outputs a pulse 90 of a current limiting signal, and the control signal, the drain current, and the signal Son transition to the L level in response to the pulse 90. However, if the current suppression by the first protection unit 110 is not working for some reason, during a time period when the rectangular-wave signal indicates an H logic, the control signal maintains the H level, and the drain current Ids continuously increases even if the first threshold value is exceeded. This may result in a failure of the switching element Q1 or the like.

In this example, the second protection unit 120 outputs the H-level signal lat2 when the drain current Ids has exceeded the second threshold value. As a result, the inversion output QB of the protective circuit 52 transitions to the L level. Therefore, the control signal is fixed to the L level and the drain current Ids is interrupted. In this way, even when the current suppression by the first protection unit 110 does not work, the overcurrent can be suppressed by the second protection unit 120, and the switching element Q1 or the like can be protected.

As shown in FIG. 6, the first protection unit 110 and the second protection unit 120 control the control signal to the L level by different paths with respect to the control signal output unit 20. The first protection unit 110 controls the control signal to the L level by setting the control pulse inputted to the control signal output unit 20 to the L level. The second protection unit 120 fixes the control signal to the L level by setting the signal inputted to the enable terminal of the control signal output unit 20 to the L level. This facilitates the maintenance of a current suppression function even if a failure is generated in any one of the paths.

Figure 8:
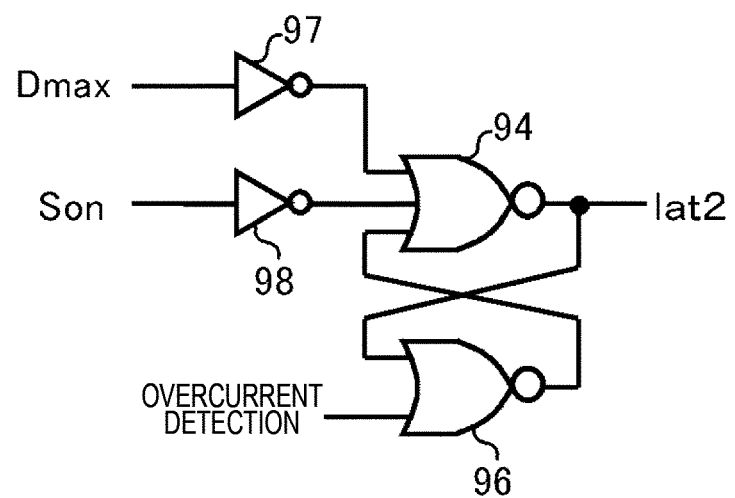
FIG. 8 shows a configuration example of a timing comparator 72.

FIG. 8 shows a configuration example of the timing comparator 72. The timing comparator 72 in this example has an inverter 97, an inverter 98, an OR circuit 94, and an OR circuit 96. The inverter 97 inverts a rectangular-wave signal Dmax to output it. The inverter 98 inverts the signal Son to output it.

The OR circuit 94 outputs a signal lat2 obtained by inverting an OR of outputs of the inverter 97, the inverter 98, and the OR circuit 96. The OR circuit 96 inverts an OR of an output of the overcurrent detection unit 74 of the second protection unit 120 and an output of the OR circuit 94, to output it.

In the timing comparator 72, when the output of the overcurrent detection unit 74 has become the H level while the rectangular-wave signal Dmax and the signal Son are the H level, the signal lat2 becomes the H level, and the switching operation of the switching element Q1 is stopped. When the first protection unit 110 is operating normally, the signal Son transitions to the L level before the output of the overcurrent detection unit 74 transitions to the H level. Therefore, the signal lat2 maintains the L level. This can avoid the excessive current suppression by the second protection unit 120.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

EXPLANATION OF REFERENCES

10: hysteresis circuit, 11, 12: internal power source, 13: protective circuit, 14: protective diode, 20: control signal output unit, 22: PWM circuit, 24: oscillating frequency control unit, 26: oscillator, 28: one-shot circuit, 30: set-reset circuit, 32: control pulse generation unit, 34: AND circuit, 36: voltage comparison unit, 38: reference voltage generation unit, 40: current source, 42: zener diode, 46: transistor, 48: OR circuit, 50: comparison circuit, 52: protective circuit, 54: AND circuit, 56: power source, 60: voltage comparator, 62: hiccup comparator, 64: inverter, 66: AND circuit, 68: resistor, 70: hiccup control unit, 72: timing comparator, 74: overcurrent detection unit, 76: delay unit, 80: power source, 90: pulse, 94, 96: OR circuit, 97, 98: inverter, 100: control circuit, 110: first protection unit, 120: second protection unit, 200: switching power source, 205: power source circuit, 210: primary-side circuit, 220: secondary-side circuit, 230: power source circuit, 240: voltage detection unit, 250: overvoltage detection unit, 401: waveform, 402: waveform, C: capacitor, D: diode, R: resistor, Q1: switching element, T1: transformer, n1: primary-side winding, n2: secondary-side winding, n3: reset winding, n4: auxiliary winding, Ids: drain current, PC1A, PC2A: light-emitting diode, PC1B, PC2B: phototransistor, DS1: diode bridge, Ld: secondary-side coil, Vout: output voltage, SR1: shunt regulator, ZD1: zener diode

What is claimed is:

1. A control circuit configured to control a switching element for performing switching control of a principal current flowing through a transformer of a switching power source, the control circuit comprising:
   a first protection unit configured to stop the principal current flowing through the switching element when the principal current of the switching element has exceeded a first threshold value, the first protection unit being configured to stop the principal current of the switching element over a first time period in response to the principal current of the switching element having exceeded the first threshold value; and
   a second protection unit configured to stop the principal current of the switching element over a second time period that is longer than the first time period when the principal current has exceeded a second threshold value larger than the first threshold value.

2. The control circuit according to claim 1 further comprising a control pulse generation unit configured to generate, for each cycle of an oscillation signal, a control pulse for controlling the switching element to an on-state, wherein
   the first protection unit is configured to shorten a pulse width of the control pulse in one cycle of the oscillation signal when the principal current has exceeded the first threshold value, and
   the second protection unit is configured to fix the switching element to an off-state over a plurality of cycles of the oscillation signal when the principal current has exceeded the second threshold value.

3. The control circuit according to claim 2 further comprising a control signal output unit configured to output, in response to the control pulse, a control signal for controlling the switching element, wherein
   the second protection unit is configured to fix the output by the control signal output unit to an off-level over a plurality of cycles of the oscillation signal when the principal current has exceeded the second threshold value.

4. The control circuit according to claim 1, wherein
   the second protection unit is configured to fix the switching element to an off-state when a level of a signal for controlling the switching element to an on-state or an off-state is an on-level for controlling the switching element to an on-state and the principal current has exceeded the second threshold value.

5. The control circuit according to claim 2, wherein
   the second protection unit is configured to fix the switching element to an off-state when a level of a signal for controlling the switching element to an on-state or an off-state is an on-level for controlling the switching element to an on-state and the principal current has exceeded the second threshold value.

6. The control circuit according to claim 3, wherein
   the second protection unit is configured to fix the switching element to an off-state when a level of a signal for controlling the switching element to an on-state or an off-state is an on-level for controlling the switching element to an on-state and the principal current has exceeded the second threshold value.

7. The control circuit according to claim 4, wherein the second protection unit includes:
   an overcurrent detection unit configured to detect an overcurrent state where the principal current has exceeded the second threshold value; and
   a timing comparator configured to fix the switching element to an off-state when the overcurrent detection unit has detected the overcurrent state before the level of a signal for controlling transitions from an on-level to an off-level.

8. The control circuit according to claim 5, wherein the second protection unit includes:
   an overcurrent detection unit configured to detect an overcurrent state where the principal current has exceeded the second threshold value; and
   a timing comparator configured to fix the switching element to an off-state when the overcurrent detection unit has detected the overcurrent state before the level of a signal for controlling transitions from an on-level to an off-level.

9. The control circuit according to claim 6, wherein the second protection unit includes:
   an overcurrent detection unit configured to detect an overcurrent state where the principal current has exceeded the second threshold value; and
   a timing comparator configured to fix the switching element to an off-state when the overcurrent detection unit has detected the overcurrent state before the level of a signal for controlling transitions from an on-level to an off-level.

10. The control circuit according to claim 7, wherein
a current detecting signal indicating a magnitude of the principal current is inputted to the first protection unit and the second protection unit, and
the second protection unit further includes a delay unit configured to delay the current detecting signal to input the current detecting signal to the overcurrent detection unit.

11. The control circuit according to claim 8, wherein
a current detecting signal indicating a magnitude of the principal current is inputted to the first protection unit and the second protection unit, and
the second protection unit further includes a delay unit configured to delay the current detecting signal to input the current detecting signal to the overcurrent detection unit.

12. The control circuit according to claim 9, wherein
a current detecting signal indicating a magnitude of the principal current is inputted to the first protection unit and the second protection unit, and
the second protection unit further includes a delay unit configured to delay the current detecting signal to input the current detecting signal to the overcurrent detection unit.

13. The control circuit according to claim 10, wherein
a delay time in the delay unit is longer than an operation time from when the current detecting signal indicating that the principal current exceeding the first threshold value has flowed is inputted to the first protection unit to when the first protection unit stops the principal current.

14. The control circuit according to claim 11, wherein
a delay time in the delay unit is longer than an operation time from when the current detecting signal indicating that the principal current exceeding the first threshold value has flowed is inputted to the first protection unit to when the first protection unit stops the principal current.

15. The control circuit according to claim 12, wherein
a delay time in the delay unit is longer than an operation time from when the current detecting signal indicating that the principal current exceeding the first threshold value has flowed is inputted to the first protection unit to when the first protection unit stops the principal current.

16. The control circuit according to claim 13, wherein
a delay time in the delay unit is longer than an operation time from when the current detecting signal indicating that the principal current exceeding the first threshold value has flowed is inputted to the first protection unit to when the first protection unit stops the principal current.

17. A switching power source comprising:
a switching element; and
a control circuit configured to control the switching element, the control circuit including:
a first protection unit configured to stop a principal current flowing through the switching element when the principal current of the switching element has exceeded a first threshold value, the first protection unit being configured to stop the principal current of the switching element over a first time period in response to the principal current of the switching element having exceeded the first threshold value; and
a second protection unit configured to stop the principal current of the switching element over a second time period that is longer than the first time period when the principal current has exceeded a second threshold value larger than the first threshold value.

18. The switching power source according to claim 17, wherein
the control circuit further includes a control pulse generation unit configured to generate, for each cycle of an oscillation signal, a control pulse for controlling the switching element to an on-state,
the first protection unit is configured to shorten a pulse width of the control pulse in one cycle of the oscillation signal when the principal current has exceeded the first threshold value, and
the second protection unit is configured to fix the switching element to an off-state over a plurality of cycles of the oscillation signal when the principal current has exceeded the second threshold value.

19. The switching power source according to claim 18, wherein
the control circuit further includes a control signal output unit configured to output, in response to the control pulse, a control signal for controlling the switching element, and
the second protection unit is configured to fix the output by the control signal output unit to an off-level over a plurality of cycles of the oscillation signal when the principal current has exceeded the second threshold value.

20. The switching power source according to claim 17, wherein
the second protection unit is configured to fix the switching element to an off-state when a level of a signal for controlling the switching element to an on-state or an off-state is an on-level for controlling the switching element to an on-state and the principal current has exceeded the second threshold value.

* * * * *